US007523408B2

(12) United States Patent
Barrios et al.

(10) Patent No.: US 7,523,408 B2
(45) Date of Patent: Apr. 21, 2009

(54) REPRESENTING STATUS INFORMATION IN A STORAGE SUBSYSTEM COPY SERVICES PRODUCT

(75) Inventors: Daiv S. Barrios, San Jose, CA (US); Linda Benhase, Tucson, AZ (US); Mary C. Burton, Tucson, AZ (US); Shekhar G. Kale, Sunnyvale, CA (US); Amy N. Morris, San Jose, CA (US); Maria S. Rajakannimariyan, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 830 days.

(21) Appl. No.: 10/449,671

(22) Filed: May 30, 2003

(65) Prior Publication Data

US 2004/0243778 A1 Dec. 2, 2004

(51) Int. Cl.
*G06F 3/048* (2006.01)
(52) U.S. Cl. .................. 715/772; 715/771; 715/748
(58) Field of Classification Search ............. 715/772, 715/773, 771, 748, 734, 735, 736, 740, 969, 715/966; 711/147, 148, 150, 156, 161, 162
See application file for complete search history.

(56) References Cited

U.S. PATENT DOCUMENTS

| | | | |
|---|---|---|---|
| 3,862,615 A | 1/1975 | Liou et al. ............. | 116/135 |
| 5,061,958 A | 10/1991 | Bunker et al. ............. | 355/209 |
| 5,157,763 A | 10/1992 | Peters et al. ............. | 395/157 |
| 5,455,926 A | 10/1995 | Keele et al. ............. | 395/404 |
| 5,706,411 A | 1/1998 | McCormick et al. ....... | 395/113 |
| 5,777,811 A | 7/1998 | Bodo ..................... | 360/15 |
| 6,088,707 A | 7/2000 | Bates et al. ............. | 707/501 |
| 6,138,150 A * | 10/2000 | Nichols et al. ........ | 715/835 X |
| 6,208,345 B1 * | 3/2001 | Sheard et al. ........... | 715/853 |
| 6,345,368 B1 * | 2/2002 | Bergsten ............... | 711/162 X |
| 6,453,132 B2 | 9/2002 | Ishikura ................. | 399/81 |

(Continued)

FOREIGN PATENT DOCUMENTS

JP 7-95524 4/1995

(Continued)

OTHER PUBLICATIONS

CuteFTP User's Guide 4.0.*

(Continued)

*Primary Examiner*—Boris Pesin
(74) *Attorney, Agent, or Firm*—Scully, Scott, Murphy & Presser, P.C.

(57) ABSTRACT

A computer-generated user interface for setting up source-target pairs of storage resources, and representing the status of copying activities of the pairs, in a disk storage server or other storage device. The interface (500) identifies each storage resource, such as volumes, in the storage device (100, 110, 120, 130), and one or more storage resources in the same or a different storage device (100, 110, 120, 130) for which a copy relationship has been established. One or more status icons are displayed to provide information related to the copy relationship, such as whether copying is in progress, the type of copying, copying progree and the like. A task wizard interface (300, 400) enables a user to designate desired copy relationships between storage resources. The user may select indicia associated with the resources to set up the copy relationships.

19 Claims, 5 Drawing Sheets

U.S. PATENT DOCUMENTS

| | | | |
|---|---|---|---|
| 6,459,496 B1 | 10/2002 | Okazawa | 358/1.14 |
| 6,854,035 B2* | 2/2005 | Dunham et al. | 711/117 |
| 6,927,770 B2* | 8/2005 | Ording | 345/440 |
| 7,096,269 B2* | 8/2006 | Yamagami | 711/162 X |
| 7,120,768 B2* | 10/2006 | Mizuno et al. | 711/162 |
| 2005/0055641 A1* | 3/2005 | Machida | 715/734 |

OTHER PUBLICATIONS

CuteFTP web site showing the release date of CuteFTP4.0.*

IBM Technical Overview, "Total Storage Enterprise Storage Server (ESS)", Nov. 2001.

* cited by examiner

US 7,523,408 B2

REPRESENTING STATUS INFORMATION IN A STORAGE SUBSYSTEM COPY SERVICES PRODUCT

This application is related to U.S. patent application Ser. No. 10/449,632, filed May 30, 2003, and entitled "Representing A Storage Subsystem Logical Configuration In A Graphical User Interface Using A Tree Metaphor" (TUC9-2003-0026US1).

BACKGROUND OF THE INVENTION

1. Field of Invention

The invention relates generally to the field of data storage in computer systems and, more specifically, to a user interface for representing the status of copying activities between source-target pairs of storage resources in a storage server or other storage device.

2. Description of Related Art

Computer systems such as storage area networks (SANs) increasingly rely on storage products such as storage servers to store massive amounts of data. The computer systems can provide data sharing among hosts, peer-to-peer copying with other storage servers, and immediate or "flash" copying of data for backup, data mining and other uses; An administrator or other user of the storage server manages and oversees its activities by selecting specific source and target storage resources for copying data. In a copying process, data is copied from the source resource to the target resource in the pair. To this end, it is important for the user to be able to quickly identify available resources and to monitor the progress of the copying. However, existing user interfaces have not been satisfactory in presenting all relevant information to the user at one time, including the status of storage resources that are part of one or more source-target pairs. Moreover, existing user interfaces have not been satisfactory in enabling the user to select source-target pairs of storage resources.

BRIEF SUMMARY OF THE INVENTION

To overcome these and other deficiencies in the prior art, the present invention describes a user interface for setting up source-target pairs of storage resources, and representing the status of copying activities in a storage server or other storage device, including the status of storage resources that are part of one or more source-target pairs.

In one aspect of the invention, a computer generated user interface for informing a user of a copy status of storage resources of a computer system is provided. The interface includes a display identifying a plurality of storage resources and copy relationships between the storage resources, including multiple copy relationships of at least one of the storage resources.

In a further aspect of the invention, a computer generated user interface includes a display identifying storage resources and copy relationships between the storage resources, including multiple copy relationships of at least one of the storage resources. The display identifies copy statuses associated with the copy relationships, including whether copying is in progress, whether copying is completed, and/or whether copying is suspended.

In a further aspect of the invention, a computer generated user interface includes a display identifying storage resources and copy relationships between the storage resources, including multiple copy relationships of at least one of the storage resources. The copy relationships include source-target pairs of the storage resources, and the display identifies copy types associated with the copy relationships.

Related computer program products are also provided.

BRIEF DESCRIPTION OF THE DRAWINGS

These and other features, benefits and advantages of the present invention will become apparent by reference to the following text and figures, with like reference numbers referring to like structures across the views, wherein.

DETAILED DESCRIPTION OF THE INVENTION

Figure 1:
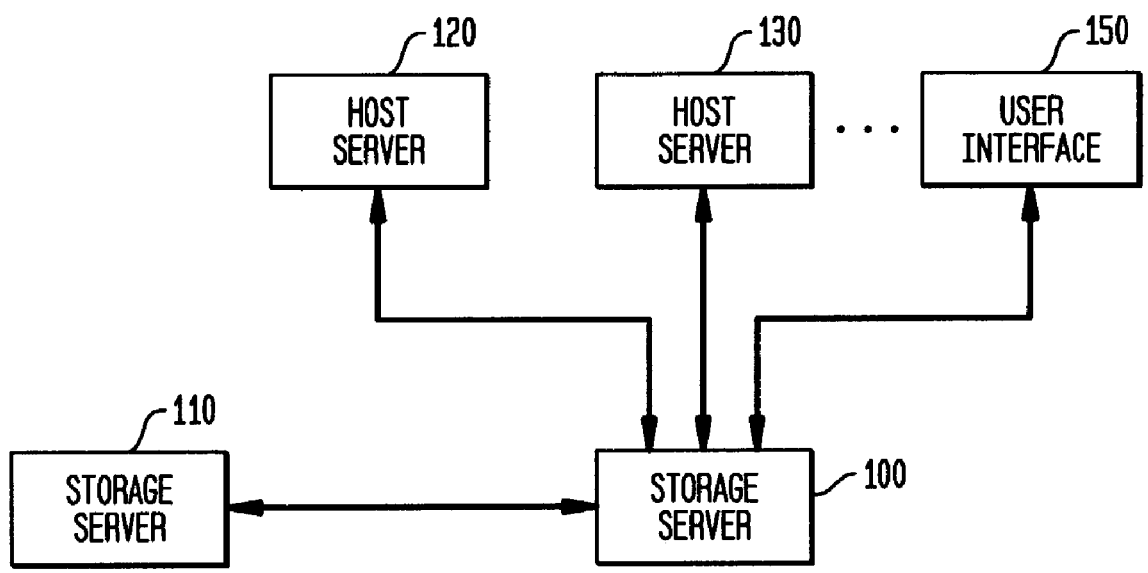
FIG. 1 illustrates an overview of storage servers, hosts, and a user interface in a computer system.

FIG. 1 illustrates an overview of storage servers, hosts, and a user interface in a computer system. Storage servers 100 and 110, which may be IBM Enterprise Storage Servers (ESSs), for instance, host servers 120 and 130 or other hosts, and a user interface 150 are illustrated in a simplified example. The storage servers 100 and 110 typically can connect to a variety of host servers, which may be servers that store data for different networks. For example, a large corporation or other enterprise may have a network of servers that each store data for a number of workstations used by individual employees. Periodically, the data on the host servers 120, 130 is backed up to the high-capacity storage server 100 to avoid data loss if the host servers 120, 130 malfunction. The storage server 100 can also provide data sharing between host servers since it is accessible to each host server. The storage server 100 itself may have redundant storage resources to provide an additional safeguard against data loss. However, as a further measure, the data of the storage server 100 may be mirrored to another storage server, such as storage server 100, which is typically at a remote site. Note that multiple storage servers may also be present at one site to provide a sufficient backup capability to a group of hosts. A storage server of a particular type, such as one that uses disk storage, may connect to one or more other peer disk storage servers as well as to other storage devices, such as those using magnetic tape. Communication between the devices may be achieved using any desired communication protocol and medium.

The user interface 150 may include a workstation with video screen. The computing resources of the workstation run software, e.g., by executing computer code devices such as computer code in a known manner, to access information in the storage server 100 to generate a display that allows the user to set up source-target pairs of storage resources for copying data, and provides information regarding the status of copying activities in the storage server 100.

Figure 2:
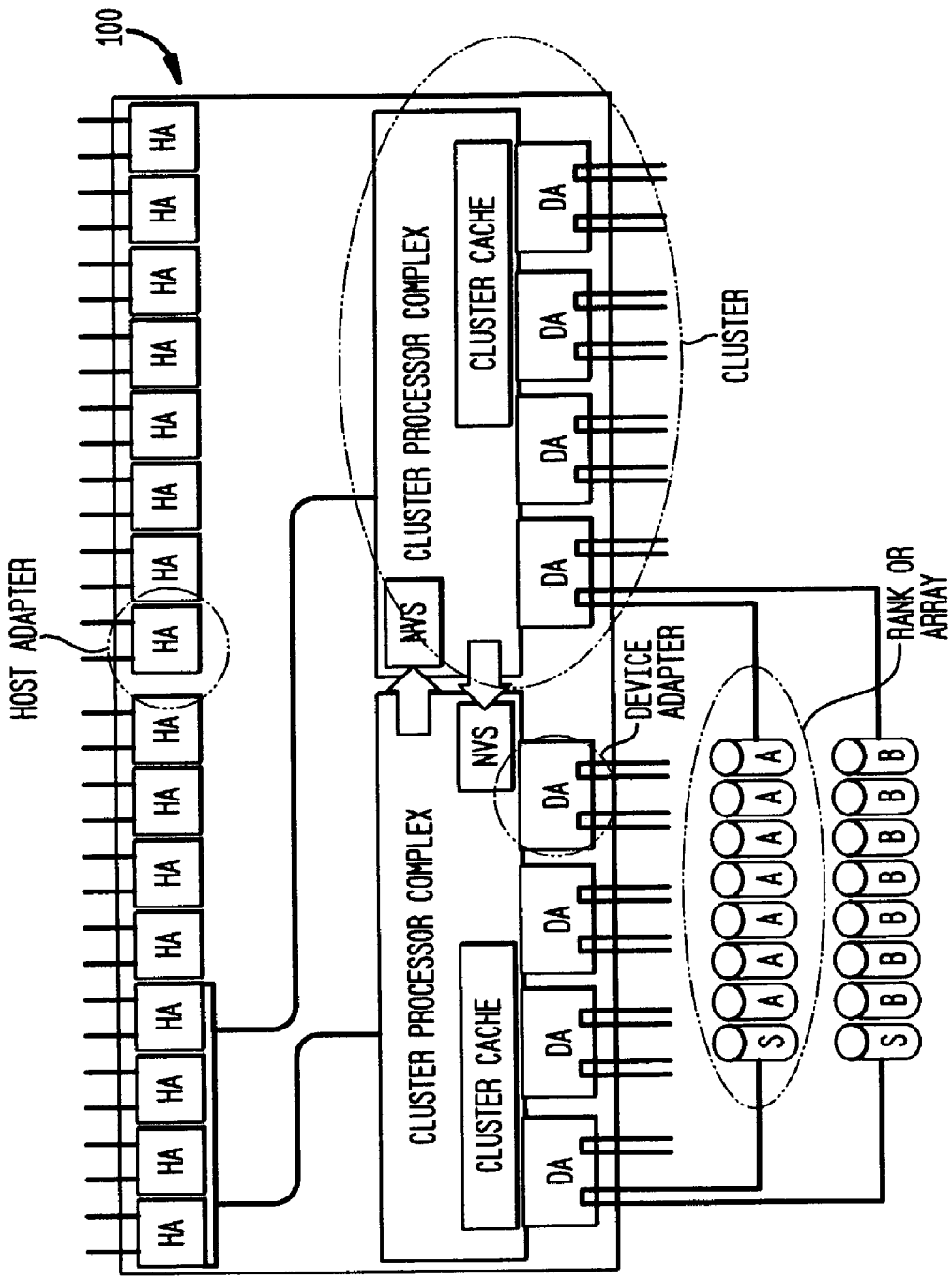
FIG. 2 illustrates an overview of a logical structure of a storage server.

FIG. 2 illustrates an overview of a logical structure of the storage server 100. The example shown relates to the IBM Enterprise Storage Server (ESS), which includes special features such as redundant storage resources that may not be used in other storage devices. However, the overview is an example only to show one way in which a storage server may connect to other devices and arrange the storage of data internally. The user interface of the present invention does not require the specific configuration shown, and is suitable for use with other storage devices, as will be apparent to those skilled in the art.

The storage server 100 includes two clusters for redundancy. Each cluster includes a cluster processor complex, a cluster cache, and device adapters to connect disk storage resources to the cluster processor complexes. The cluster processor complexes each work independently. Each may contain symmetric multi processors with (volatile) cache, non-volatile storage/cache (NVS), and device adapters (DA). The device adapters, which are installed in pairs, one in each cluster, are used to connect disks to the cluster processor complexes. Disk arrays or ranks are attached to the two DAs. The ranks can be configured as RAID 5 (redundant array of independent disks) or non-RAID arrays. In the ranks, "S" indicates a spare disk and "A" and "B" identify the rank.

Host adapters (HAs) are external interfaces which may support two ports, either small computer systems interface (SCSI) or IBM's enterprise systems connection (ESCON), which is an Enterprise Systems Architecture/390 and zSeries computer peripheral interface. This I/O interface uses ESA/390 logical protocols over a serial interface that configures attached units to a communication fabric. For example, the remote storage server 110, host servers 120, 130 and the user interface 150 may communicate with the storage server 100 via the HAs. Fibre channel or fibre-channel connection (FI-CON) has support for one channel per HA. Each HA connects to both cluster processor complexes so that either cluster can handle I/Os from any host adapter. A system adapter identification number (SAID) is a unique identification number automatically assigned to each HA.

The user interface 150 communicates with the storage server 100 to obtain information regarding the storage resources and the status of copy operations. Additionally, the user interface 150 communicates instructions for setting up source-target pairs and initiating copying operations. The user interface 150 may also communicate with the host servers 120, 130 and other hosts, as well as the storage server 110, via the storage server 100 via or other paths. Software may run on the user interface 150 alone, or on both the interface 150 and the storage server 100, e.g., as a distributed application, to achieve the desired flow of information using known computing techniques. For example, processing resources in the storage server 100, such as in the cluster processor complexes or other processor not specifically shown, may maintain information regarding a hierarchy of storage resources. At the first, highest level of the hierarchy is the device level, which may include the storage servers 100 and I 10, and the host servers 120 and 130. The second level represents storage resources within a specific device. For example, the storage servers and hosts may have logical subsystems (LSSs), which in turn are comprised of volumes, in the third level of the hierarchy. The LSS is a topological construct that includes a group of logical devices such as logical volumes, which may be units of recording medium associated with a logical disk drive. For example, a logical volume in a RAID array may be spread over the disks in the array. The units may include sectors of one or more disks.

The processing resources in the storage server 100 may continuously monitor the activities of the various storage resources, including whether a resource has been designated as a source resource from which data is copied, or a target resource to which data is copied, which resources are paired in a copy relationship, whether data is currently being read from, or written to, a resource, what type of copying is occurring, e.g., peer-to-peer or point-in-time, which sectors of a disk resource are involved in copying, what percent of the copying has been completed, and whether copying has been temporarily suspended. Information regarding these activities may be tracked using appropriate data constructs in a database that is dynamically updated as the information changes. Information that does not usually change, such as the size and type of the storage resource, can also be maintained.

Moreover, when storage resources external to a single storage device are involved in a copying operation with the subject storage device 100, such as another storage device 110, or host servers 120 and 130, the processing resources in the storage server 100 may communicate with these external devices to obtain analogous information regarding their storage resources.

The various types of copying operations that may occur may be classified generally as point-in-time copying and continual copying. An example of point-in-time copying is flash copying, which provides an instant copy of a volume, e.g., within the storage device 100. This may be used to create test data, temporary checkpoint copies, or for asynchronous backup, or to perform data mining and data warehousing on the copied data. Concurrent copying provides a copy of a volume or data set within a few seconds. It enables a program to make a backup of a data set while the logical volume remains available for subsequent processing. The data in the backup copy is frozen at the point-in-time that the server responds to the request. Concurrent copying is generally used with mainframe host computers.

An example of continual copying is peer-to-peer remote copying (PPRC), e.g., between the storage servers 100 and 110, or within a storage server. PPRC is a synchronous mirroring, and is typically used as a disaster recovery solution. It maintains a consistent copy of a logical volume on the same storage server or on another storage server. All modifications that any attached host performs on the primary logical volume are also performed on the secondary logical volume. A related type of copying, PPRC extended distance, maintains a fuzzy copy of a logical volume on the same ESS or on another ESS. In other words, all modifications that any attached host performs on the primary logical volume are also performed on the secondary logical volume at a later point-in-time. The original order of update is not strictly maintained. When the copying is performed within a storage server, which is less common than storage server-to-storage server copying, the copying may be thought of as non-remote peer-to-peer copying. However, for simplicity, the terms "PPRC" and "peer-to-peer" as used herein should be considered to encompass both remote and non-remote peer-to-peer copying.

Extended remote copying (XRC), e.g., between the storage server 100 and host 120 and 130, provides asynchronous mirroring. It assists a control program to maintain a consistent copy of a logical volume on another storage facility. All modifications of the primary logical volume by any attached host are presented in order to a single host. The host then makes these modifications on the secondary logical volume. XRC is generally used with mainframe host computers.

Figure 3:
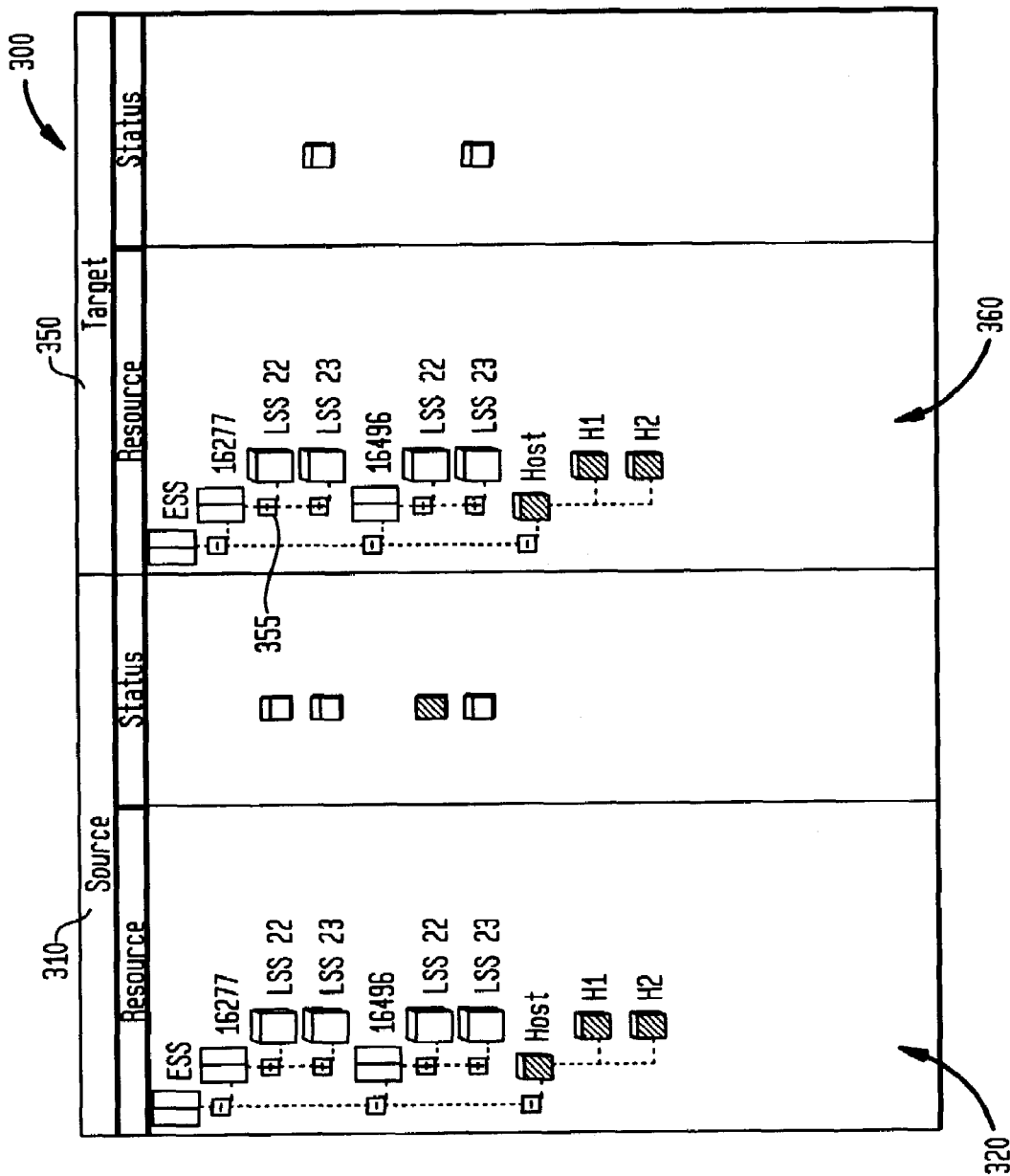
FIG. 3 illustrates a first user interface for setting up source-target pairs.

FIG. 3 illustrates a first user interface for setting up source-target pairs. The interface 300 is generated using known techniques from data that is available at the user interface workstation 150 and/or the storage server 100. The interface 300 acts as a software task wizard to assist the user in various tasks, including monitoring the availability of storage resources, designating source-target pairs of storage resources, and monitoring the progress of copying operations in the source-target pairs. The interface may be part of a web browser-like interface that includes the interface 500 of FIG. 5. The interface 300 has a first region 310 and a second region 350 which have indicia for identifying a number of storage resources as source resources or target resources. Additionally, each region 310, 350 has sub regions identifying "resources" and "status." Under "resources", the indicia identify the name of the resource, for example. Here, the indicium "ESS" identifies the overall IBM storage system. Two storage servers are identified, one having serial number 16277 and the other serial number 16496. For example, the storage server 100 that is local to the user interface 150 may have serial number 16277, while the remote storage server 110 may have serial number 16496. Two LSSs, designated by "LSS 22" and "LSS 23" are associated with each storage server. The notation given is just an example. Additionally, the interface 300 identifies a host, i.e., "Host," and two subsystems such as disk drives, i.e., "H1" and "H2." Under "status," one or more icons or text may be present which provides status information. The icon may be selected from a library of icons, as discussed further below. In the present example, the storage resources in the first and second regions 310, 350, respectively, of the interface 300, are common. However, it is also possible for certain resources to be available only as a host or target, in which case the unavailable resources will not appear on the interface 300 accordingly. Or, the unavailable resources may appear on the interface 300 in a manner that indicates they are unavailable, such as by graying out their displayed information or providing other appropriate indicia.

Furthermore, the storage resources may be presented in logical trees 320 and 360 where different hierarchical levels of the resources are located at different nodes of the tree. In the present example, the overall storage system "ESS" is at the first level, the storage servers "16277" and "16496" and the host "Host" are at the second level, and the LSSs "LSS 22" and "LSS 23" and the host resources H1 and H2, such as disks, are at the third level. Various icons may be associated with each storage resource to indicate its type, e.g., system, server, host, LSS, disk or volume.

Figure 4:
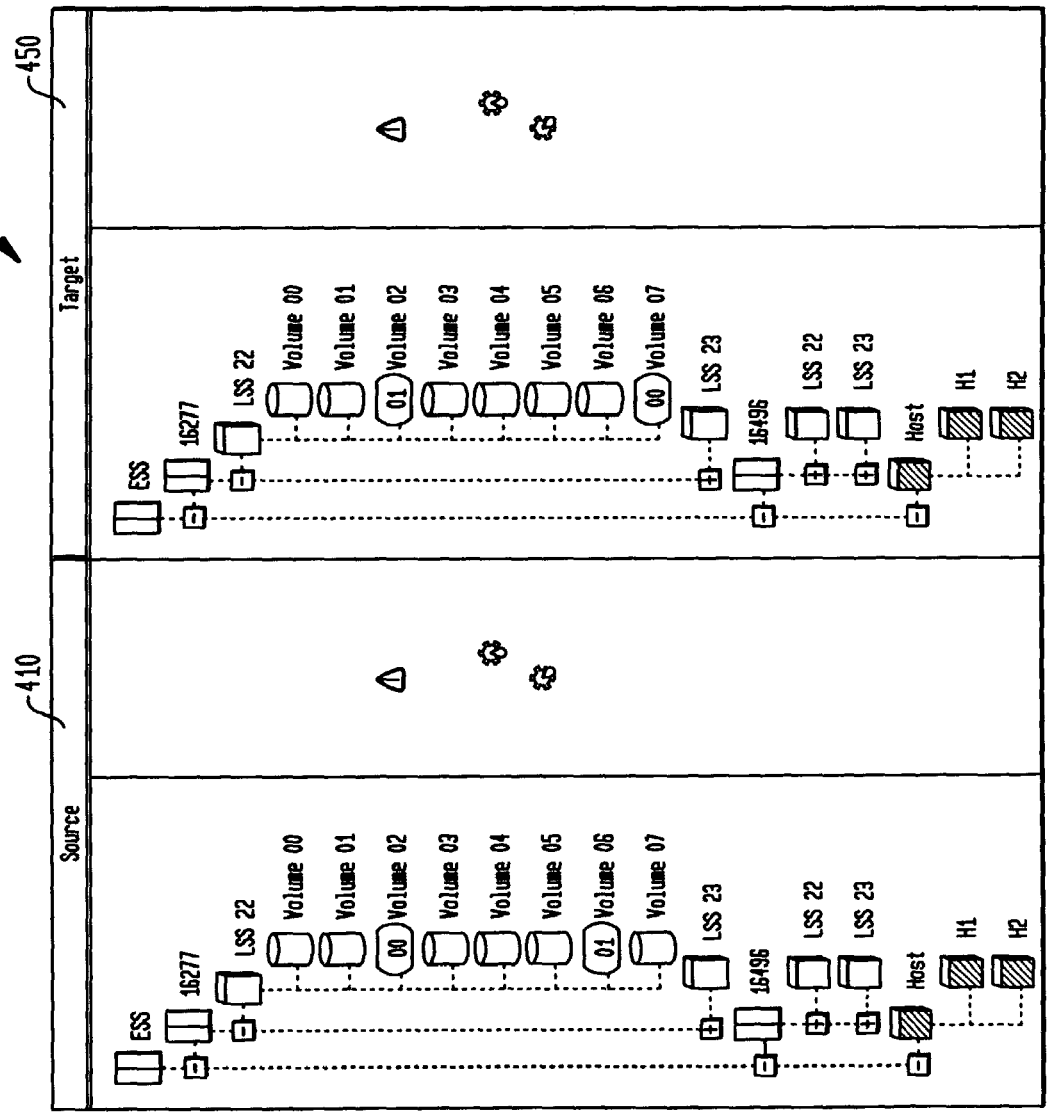
FIG. 4 illustrates the first user interface in an expanded logical tree display.

Note that the interface 300 shows the trees 320 and 360 in a compacted form, where only high-level information regarding the storage resources is displayed. High level information is expanded to the appropriate level for the operation at hand, e.g., ESSs are expanded to the LSS level since volume copies take place at least at the LSS level. To obtain detailed information, the user may use a pointing device such as a mouse to select a particular resource and click on indicia for expanding the tree. For example, the user may click on the "+" indicia 355 to view detailed information regarding the storage resource "LSS 22" under storage server serial number 16277. By doing so, an updated interface 400 (FIG. 4) is displayed. In particular, storage resources volumes 00 through volume 07 at the fourth level of the tree are displayed under the associated LSS. The logical trees may be expanded on one side automatically when the other side is manually expanded based on rules associated with copy types, or the user may expand both sides manually.

In the present example, the user uses the interface 400 to designate source-target pairs of resources. In other words, copy relationships between storage resources are established. This may be achieved in different ways. For example, to establish a copy relationship between Volume 02 as a source and Volume 07 as a target, the user may use a mouse to highlight the indicia "Volume 02" from the source region 410 of the interface 400 and the indicia "Volume 07" in the target region 450 of the interface 400, then click on a "next" button. Or, a drag and drop, or a drop down list may be used. Various other techniques which will be apparent to those skilled in the art may be used. Once a copy relationship is established, indicia may appear to identify the related resources. For example, the indicia "00" may appear adjacent the indicia "Volume 02" in the source region 410 and adjacent the indicia "Volume 07" in the target region 450. The user thus interacts with the interface 400 by selecting the indicia to set up copy relationships.

Additional copy relationships may be established similarly, e.g., between Volume 06 as a source and Volume 02 as a target, in which case the indicia "01" may appear adjacent the indicia "Volume 06" in the source region 410 and adjacent the indicia "Volume 02" in the target region 450. Any number of copy relationships may be thusly established. The indicia "00" and "01" are counters for each new copy relationship.

A copy relationship that has been established may be terminated using various techniques. For example, the user may select one of the volumes in the interface 500 of FIG. 5, e.g., using a mouse, and right click to bring up tasks that include "delete copy relationship." Or, various options in region 510 of interface 500 may be used.

A copy relationship may also be suspended, which means it is still established but cannot be executed. Indicia such as "S" or an icon coded based on, e.g., size, shape and/or color, may appear next to the affected storage resources in the interface 400 to indicate a suspension. A consistency group may also be established with a number of storage resources. This refers to a group of volumes that may be kept consistent in terms of data consistency (if an error occurs, information subsequent to the error does not get copied) or point-in-time consistency (data is kept consistent to a certain point-in-time). The above are all generally considered to be copy relationships.

Note that the type of copy relationship that has been established may be set by the user according to the path that was used to invoke the interfaces 300 or 400. For example, various indicia at the left-hand side of the interface 500 of FIG. 5 may be used to set up specific types of copy relationships and invoke the interfaces 300 or 400. The interfaces 300 and 400 may have a caption that indicates what activity is being designated. The indicia may include the following selections:

Flash Copy
Establish Flash Copy pair
Withdraw Flash Copy pair
PPRC (peer-to-peer remote copy)
Establish paths
Remove paths
Establish PPRC pair
Suspend PPRC pair
Terminate PPRC pair
Resume consistency group
Freeze consistency group Once the user sets up the desired copy relationships among the storage resources using the interfaces 300 and 400, which may be overlaid, or replace the workspace while interface 500 is still accessible as smaller windows on the interface 500, a command such as "execute" or "run" is invoked, e.g., from a "finish" button in the interface 400 to cause the desired copying operations to begin. The interfaces 300 and/or 400 may be closed or toggled out of to enable the user to fully view the status interface 500.

Figure 5:
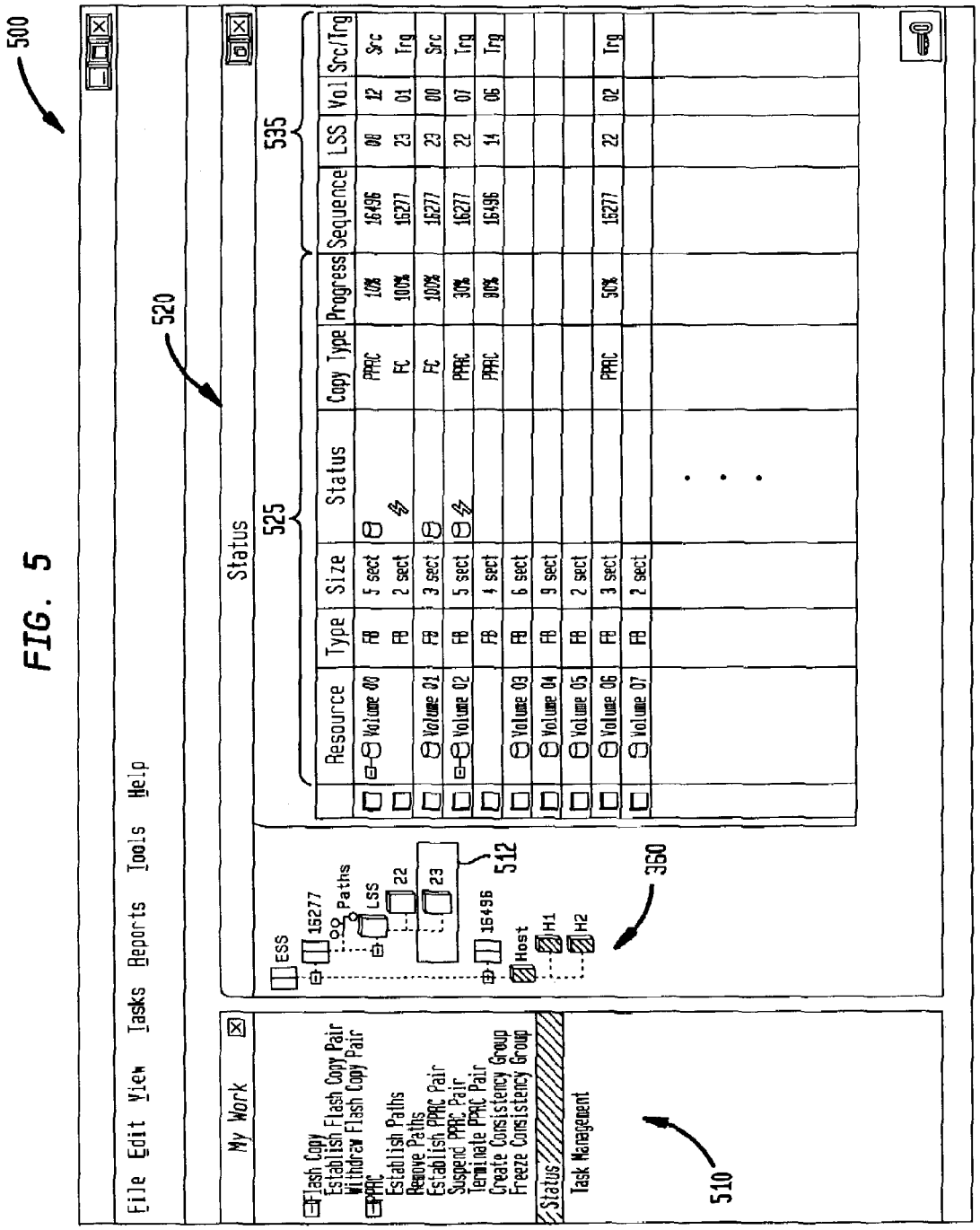
FIG. 5 illustrates a second user interface showing the status of storage resources.

Referring to FIG. 5, the status interface 500 allows the user to obtain information pertaining to the status of copy actions and relationships. To this end, the status interface 500 provides information, e.g., in table form, with columns that provide relevant information regarding the copy systems objects, e.g., volumes and system adapter identification numbers (SAIDs). SAIDs, which identify the hosts, would be found under "paths" in region 510. A particularly advantageous feature is that multiple copy relationships of storage resources such as volumes are depicted.

Information in the status interface 500 provides at-a-glance information regarding copy status and relationships. The "status" column provides a summary of the in progress status as associated with a copy type of the user interface application. More information is obtained when the user obtains properties on individual resources in the status table, e.g., via the "file, properties" menu bar item in the application, or by selecting "properties" from a right-click menu. Icons are used to represent complex copy function relationships in one comprehensive view. These icons also may be used as appropriate in the status columns found in the task wizards, e.g., interfaces 300 and 400. Tooltips that describe the meaning of a status icon may appear when the user holds the mouse over a status icon. Users may also click on a status icon to obtain more information. Also, a user may select a key icon in the lower right hand corner of the status interface 500 to display a legend of icon meanings. In the table or library below, icons do not appear. However, any desired graphical icon, alphanumeric text or other indicia may be used. Coding based on color, size, shape and the like of the icons may be used to convey the desired information. The table may include the following items. Of course, these are examples only, and not all items are required, and additional items may be used.

Table of Icons:
Designated source
Designated target
Synchronous PPRC source
Synchronous PPRC target
PPRC source copy in progress
PPRC target copy in progress
PPRC source suspended
PPRC target suspended
PPRC Extended Distance source
PPRC Extended Distance target
FlashCopy source
FlashCopy target
Change recording enabled
Data set FlashCopy
Volume copy
Multiple relationship FlashCopy
Unknown state In the status interface 500, the logical tree 360 is provided in a first region 510, while corresponding storage resources are provided in a second region 520. For example, if the user selects the node corresponding to the path "ESS", "16277", "LSS", "23", e.g., indicia 512, the information displayed in the second region 520 will be for the storage resources associated with that node, e.g., storage resources identified as Volume 00 through Volume 07. The user can thus click on different nodes of the tree to view the status of the associated resources. In the second region 520, a first column is a checkbox that can be checked by the user to obtain properties of the associated storage resource or to refresh the status of a resource. The user may select one or more volumes and choose "file", "properties" from the application menu bar. If properties are requested for more than one volume, volume properties are concatenated in one "properties" window.

As noted, status information, e.g., icons, is also displayed in the task wizards, such as interfaces 300 and 400. The status information offered in the task wizards represents a subset of what is available under the status portion of the application. This information is updated dynamically. Status columns appear to the right of source and target trees in the LSS/volume/SAIDs selection panels used to select LSS/volume/SAIDs in task wizards. Icons represent current status on volumes. Status icons may be left justified in the status column. Note also in the region 360 that the node for the storage server "16496" is compacted but can be expanded by the user by clicking on the "+" indicia next to it to display the associated LSS resources.

A group of columns 525 provides information for the subject storage resources associated with the selected node, while a group of columns 535 provides information for storage resources, not necessarily associated with the same node of the subject storage resources e.g., copy peer resources. A "resource" column identifies the subject storage resource, e.g., "Volume 00" through "Volume 07". A "type" column identifies a type of the resource, e.g., FB for fixed block. A "size" column identifies a size of the resource, e.g., a number of sectors (sect). A "status" column provides a status of a copy relationship with which the resource is associated. One or more icons, such as from the above table, may identify the status. A "copy type" column identifies a copy type of the copy relationship, e.g., PPRC or FC. A "progress" column identifies a percentage of the copying completed, or may indicate that copying is in progress. A "sequence" column provides a sequence or serial number or other identifier of the storage device, e.g., storage server, which is a target or source for the subject storage resource. An "LSS" column identifies an LSS that is a target or source for the subject storage resource. A "Vol." column identifies a volume that is a target or source for the subject storage resource. A "Src/Trg" column identifies whether the resource identified by the "Sequence," "LSS", and "Vol." columns is a source or target for the subject storage resource. For the storage resources having multiple copy relationships, information may be provided for each copy relationship in a separate row of the table.

With the above in mind, each row of the table can be interpreted. Note that the example copy relationships in interface 500 include the copy relationships set up in interface 400. Volume 00 in the node corresponding to the path "ESS", "16277", "LSS", "23", has two copy relationships. One is with the storage server having sequence number 16496 (a different storage server), LSS 08, Volume 12, which is a source resource. Volume 00 is therefore the target. Volumes 00 and 12 are thus a source-target pair. The copy type is PPRC. The other copy relationship is with the storage server having sequence number 16277 (the same storage server), LSS 23 (the same LSS), Volume 01, which is a target resource. Volume 00 is therefore the source. The copy type is Flash Copy (FC). Advantageously, these multiple copy relationships for the storage resource Volume 00 are conveniently provided for the user's information. Note that essentially any number of multiple copy relationships for a given storage resource can be shown.

Volume 01 has a copy relationship with Volume 00 in the same storage server. Volume 00 is the source, and Volume 01 is the target. The copy type is FC. Note that this relationship is the converse of the relationship Volume 00 has with Volume 01.

Volume 02 has two copy relationships. One is with Volume 07 in LSS 22 of the same storage server. Volume 07 is the target, and Volume 02 is the source. The other copy relationship for Volume 02 is with Volume 06 of LSS 14 of the storage server having the sequence number 16496. Volume 06 is the target, and Volume 02 is the source. The copy types are PPRC. PPRC is most often used between storage servers for, e.g., disaster recovery.

Volume 03 through Volume 05 and Volume 07 do not currently have copy relationships set up. Volume 06 has a copy relationship with Volume 02 in the same storage server. Volume 06 is the source, and Volume 02 is the target. The copy type is PPRC.

Note that information regarding additional resources can be displayed, e.g., on subsequent pages of the interface 500. Also, once copying is completed for a given copy relationship, the copy relationship information may remain on the status screen, e.g., for a given period of time for a given copy type. For example, this information could remain persistent for a synchronous remote copy. For a point-in-time copy, the information may or may not remain persistent depending upon the options that a user chooses.

The invention has been described herein with reference to particular exemplary embodiments. Certain alterations and modifications may be apparent to those skilled in the art, without departing from the scope of the invention. The exemplary embodiments are meant to be illustrative, not limiting of the scope of the invention, which is defined by the appended claims.

What is claimed is:

1. A computer generated user interface for informing a user of a copy status of storage resources of a computer system, comprising:
   a display on a video screen identifying a plurality of storage resources in a hierarchical manner and at least established copy relationships between the storage resources, including multiple established copy relationships of at least one of The storage resources, the established copy relationships at least including at least status of copying activities;
   at least two frames presented simultaneously on the display identifying the established copy relationships between the plurality of storage resources, the two frames each showing The storage resources in an expandable hierarchical manner,
   wherein said display includes a status interface providing at-a-glance information associated with status of copy actions and relationships, said copy actions and relationships being associated with at least different types of copy, and said display further includes a plurality of icons representing said copy actions and relationships, said plurality of icons representing at least designated source, designated target, synchronous PPRC source, synchronous PPRC target, PPRC source copy in progress, PPRC target in progress, PPRC source suspended, PPRC target suspended, PPRC extended distance source, PPRC extended distance target, Flash copy source, Flash copy target, Data set Flash copy, and multiple relationship Flash copy.

2. The computer generated user interface of claim 1 wherein:
   the copy relationships include source-target pairs of the storage resources.

3. The computer generated user interface of claim 1, wherein:
   the display identifies copy types associated with the copy relationships.

4. The computer generated user interface of claim 3, wherein:
   the copy types identified include at least one of peer-to-peer copy, flash copy, concurrent copy, and extended remote copy.

5. The computer generated user interface of claim 1, wherein:
   the display identifies copy statuses associated with the copy relationships.

6. The computer generated user interface of claim 1, wherein:
   the copy statuses identified include at least one of: whether copying is in progress,
   whether copying is completed, and whether copying is suspended.

7. The computer generated user interface of claim 1, wherein:
   the display identifies a portion of copying completed for the copy relationships.

8. The computer generated user interface of claim 1, wherein:
   the display includes indicia identifying which of the storage resources have multiple copy relationships.

9. The computer generated user interface of claim 1, wherein:
   the display comprises a table, and the storage resources and copy relationships are identified in rows of the table.

10. The computer generated user interface of claim 1, wherein:
    the storage resources comprise volumes.

11. The computer generated user interface of claim 1, wherein:
    the storage resources are associated with a storage server.

12. The computer generated user interface of claim 1, wherein:
    the storage resources are associated with a host.

13. The computer generated user interface of claim 1, wherein:
    the display identifies resource types associated with the storage resources.

14. A computer generated user interface for informing a user of a copy status of storage resources of a computer system, comprising:
    a display on a video screen identifying a plurality of storage resources and at least established copy relationships between the storage resources, including multiple established copy relationships of at least one of the storage resources; wherein: the display region identifies copy statuses associated with the at least established copy relationships; and
    the copy statuses identified include at least one of whether copying is in progress, whether copying is completed, and whether copying is suspended; and
    the display region includes at least two frames presented simultaneously on the display identifying the at least established copy relationships between the plurality of storage resources, the two frames each showing The storage resources in an expandable hierarchical manner,
    wherein said display includes a status interface providing at-a-glance information associated with status of copy actions and relationships, said copy actions and relationships being associated with at least different types of copy, and said display further includes a plurality of icons representing said copy actions and relationships, said plurality of icons representing at least designated source, designated target, synchronous PPRC source, synchronous PPRC target, PPRC source copy in progress, PPRC target in progress, PPRC source suspended, PPRC target suspended, PPRC extended distance source, PPRC extended distance target, Flash copy source, Flash copy target, Data set Flash copy, and multiple relationship Flash copy.

15. A computer generated user interface for informing a user of a copy status of storage resources of a computer system, comprising:

a display on a video screen identifying a plurality of storage resources and at least established copy relationships between the storage resources, including multiple at least established copy relationships of at least one of the storage resources; wherein:

the at least established copy relationships include source-target pairs of the storage resources; and the display region identifies copy types associated with the at least established copy relationships; and the display region includes at least two frames presented simultaneously on the display identifying the at least established copy relationships between the plurality of storage resources, the two frames each showing the storage resources in an expandable hierarchical manner, wherein said display includes a status interface providing at-a-glance information associated with status of copy actions and relationships, said copy actions and relationships being associated with at least different types of copy, and said display further includes a plurality of icons representing said copy actions and relationships, said plurality of icons fur representing at least designated source, designated target, synchronous PPRC source, synchronous PPRC target, PPRC source copy in progress, PPRC target in progress, PPRC source suspended, PPRC target suspended, PPRC extended distance source, PPRC extended distance target, Flash copy source, Flash copy target, Data set Flash copy, and multiple relationship Flash copy.

16. A computer generated user interface for informing a user of a copy status of storage resources of a computer system, comprising:

a display on a video screen identifying: (a) a plurality of storage resources, including storage resources which are part of source-target pairs, (b) whether the storage resources in the source-target pairs are source storage resources from which data is copied or target storage resources to which data is copied, and (c) associated with each storage resource which is part of the source-target pairs, at least one status icon selected from a library of icons for identifying at least one associated copy status condition, wherein the display region includes at least two frames presented simultaneously on the display, one of the two frames identifying the source storage resources and another of the two frames identifying the target storage resources in a hierarchically expandable manner, wherein said display includes a status interface providing at-a-glance information associated with status of copy actions and relationships, said copy actions and relationships being associated with at least different types of copy, and said display further includes a plurality of icons representing said copy actions and relationships, said plurality of icons representing at least designated source, designated target, synchronous PPRC source, synchronous PPRC target, PPRC source copy in progress, PPRC target in progress, PPRC source suspended, PPRC target suspended, PPRC extended distance source, PPRC extended distance target, Flash copy source, Flash copy target, Data set Flash copy, and multiple relationship Flash copy.

17. The computer generated user interface of claim 16, wherein:

the copy status condition identified includes at least one of: whether copying is in progress, whether copying is completed, and whether copying is suspended.

18. A program storage device readable by a machine, having computer code of instructions executable by the machine for informing a user of a copy status of storage resources of a computer system, comprising:

computer code devices configured to cause a computer to generate a display identifying a plurality of storage resources and at least established copy relationships between the storage resources, including multiple established copy relationships of at least one of the storage resources, the established copy relationships at least including at least status of copying activities, at least two frames presented simultaneously on the display identifying the established copy relationships between the plurality of storage resources, the two frames each showing the storage resources in an expandable hierarchical manner, wherein said display includes a status interface providing at-a-glance information associated with status of copy actions and relationships, said copy actions and relationships being associated with at least different types of copy, and said display further includes a plurality of icons representing said copy actions and relationships, said plurality of icons representing at least designated source, designated target, synchronous PPRC source, synchronous PPRC target, PPRC source copy in progress, PPRC target in progress, PPRC source suspended, PPRC target suspended, PPRC extended distance source, PPRC extended distance target, Flash copy source, Flash copy target, Data set Flash copy, and multiple relationship Flash copy.

19. A program storage device readable by a machine, having computer code of instructions executable by the machine for informing a user of a copy status of storage resources of a computer system, comprising:

computer code devices configured to cause a computer to generate a display identifying:

(a) a plurality of storage resources, including storage resources which are part of source-target pairs, (b) whether the storage resources in the source-target pairs are source storage resources from which data is copied or target storage resources to which data is copied, and (c) associated with each storage resource which is part of the source-target pairs, at least one status icon selected from a library of icons for identifying at least one associated copy status condition, wherein the display region includes at least two frames presented simultaneously on the display, one of the two frames identifying the source storage resources and another of the two frames identifying the target storage resources in a hierarchically expandable manner, wherein said display includes a status interface providing at-a-glance information associated with status of copy actions and relationships, said copy actions and relationships being associated with at least different types of copy, and said display further includes a plurality of icons representing said copy actions and relationships, said plurality of icons representing at least designated source, designated target, synchronous PPRC source, synchronous PPRC target, PPRC source copy in progress, PPRC target in progress, PPRC source suspended, PPRC target suspended, PPRC extended distance source, PPRC extended distance target, Flash copy source, Flash copy target, Data set Flash copy, and multiple relationship Flash copy.

* * * * *